(12) United States Patent
Steindl (10) Patent No.: US 11,467,566 B2
(45) Date of Patent: Oct. 11, 2022

(54) COMMUNICATION DEVICE, COMMUNICATION TERMINAL, COMMUNICATION DEVICE AND METHOD FOR OPERATING A COMMUNICATION SYSTEM FOR TRANSMITTING TIME-CRITICAL DATA

(71) Applicant: Siemens Aktiengesellschaft, Munich (DE)

(72) Inventor: Günter Steindl, Poppenricht (DE)

(73) Assignee: SIEMENS AKTIENGESELLSCHAFT, Munich (DE)

(*) Notice: Subject to any disclaimer, the term of this patent is extended or adjusted under 35 U.S.C. 154(b) by 0 days.

(21) Appl. No.: 17/299,146

(22) PCT Filed: Nov. 7, 2019

(86) PCT No.: PCT/EP2019/080519
§ 371 (c)(1),
(2) Date: Jun. 2, 2021

(87) PCT Pub. No.: WO2020/114706
PCT Pub. Date: Jun. 11, 2020

(65) Prior Publication Data
US 2022/0050442 A1    Feb. 17, 2022

(30) Foreign Application Priority Data
Dec. 4, 2018    (EP) .................................... 18210084

(51) Int. Cl.
*G05B 19/418*    (2006.01)
*H04L 47/24*    (2022.01)
*H04L 47/72*    (2022.01)

(52) U.S. Cl.
CPC .......... *G05B 19/4185* (2013.01); *H04L 47/24* (2013.01); *H04L 47/72* (2013.01)

(58) Field of Classification Search
CPC ..... G05B 19/4185; H04L 47/24; H04L 47/72; Y02P 90/02; H04Q 3/66
See application file for complete search history.

(56) References Cited

U.S. PATENT DOCUMENTS

| 9,270,426 B1 | 2/2016 | Atlas et al. |
| 10,044,524 B1* | 8/2018 | Edelhaus ............... H04L 65/608 |
| | (Continued) | |

FOREIGN PATENT DOCUMENTS

| CN | 102377632 A | * 3/2012 | ......... H04L 12/4633 |
| CN | 103581164 | 2/2014 | |
| | (Continued) | | |

OTHER PUBLICATIONS

Meyer Philipp et al: "Extending IEEE 802.1 AVB with time-triggered scheduling: A simulation study of the coexistence of synchronous and asynchronous traffic", 2013 IEEE Vehicular Networking Conference, IEEE, pp. 47-54; 2013.
(Continued)

*Primary Examiner* — Thomas C Lee
*Assistant Examiner* — Michael Tang
(74) *Attorney, Agent, or Firm* — Cozen O'Connor (57) ABSTRACT

A method and communication system for transmitting time-critical data, wherein selected datagrams are assigned to data streams and transmitted via paths for the data streams, where reservation requests are transmitted to a higher-level communication controller to reserve resources to be provided by the communication devices for transmitting data streams, in each case via a reservation function component, which is assigned to a first or second communication terminal or a communication device that is connected to the communica-
(Continued)

tion terminal and forwards datagrams, and where in the event of reservation requests, the higher-level communication controller ascertains a respective path and checks whether sufficient resources for transmitting the data streams while maintaining the specified service quality parameters are available in communication devices along the respective path, and the higher-level communication controller ascertains a proposed local cycle duration for selected communication devices.

17 Claims, 3 Drawing Sheets

(56) References Cited

U.S. PATENT DOCUMENTS

| | | | |
|---|---|---|---|
| 10,298,380 B2 | 5/2019 | Kiessling | |
| 2002/0057680 A1* | 5/2002 | Ofek | H04L 12/6418 370/372 |
| 2004/0128397 A1* | 7/2004 | Glasmann | H04L 47/70 709/238 |
| 2006/0242287 A1* | 10/2006 | Cetin | H04L 61/6013 709/223 |
| 2013/0275566 A1* | 10/2013 | Huth | H04L 41/0803 709/220 |
| 2013/0301553 A1* | 11/2013 | Klein | H04W 40/22 370/329 |
| 2014/0025833 A1 | 1/2014 | Kiessling | |
| 2015/0131443 A1 | 5/2015 | Nöbauer et al. | |
| 2015/0200838 A1* | 7/2015 | Nadeau | H04L 45/306 370/254 |
| 2015/0326493 A1 | 11/2015 | Mace et al. | |
| 2016/0050119 A1* | 2/2016 | Chhabra | H04L 47/724 370/241.1 |
| 2016/0173442 A1* | 6/2016 | Albrecht | H04L 43/0805 370/254 |
| 2018/0176853 A1* | 6/2018 | Chen | H04W 8/005 |
| 2018/0302911 A1* | 10/2018 | Aijaz | H04L 12/1854 |
| 2019/0020738 A1* | 1/2019 | Paul | H04L 47/825 |
| 2019/0116544 A1* | 4/2019 | Glottmann | H04B 7/195 |
| 2019/0199641 A1* | 6/2019 | Lo Bello | H04L 47/22 |
| 2019/0253339 A1* | 8/2019 | Mehmedagic | H04L 45/64 |
| 2021/0227452 A1* | 7/2021 | Munz | H04W 76/10 |
| 2021/0400524 A1* | 12/2021 | Kahn | H04W 28/0268 |

FOREIGN PATENT DOCUMENTS

| | | |
|---|---|---|
| CN | 104285423 | 1/2015 |
| CN | 105207903 | 12/2015 |
| CN | 106921594 | 7/2017 |
| EP | 3038325 | 6/2016 |
| WO | 2019001718 | 1/2019 |

OTHER PUBLICATIONS

International Search Report dated Feb. 20, 2020 based on PCT/EP2019/080519 filed Nov. 7, 2019.

* cited by examiner

COMMUNICATION DEVICE, COMMUNICATION TERMINAL, COMMUNICATION DEVICE AND METHOD FOR OPERATING A COMMUNICATION SYSTEM FOR TRANSMITTING TIME-CRITICAL DATA

CROSS-REFERENCE TO RELATED APPLICATIONS

This is a U.S. national stage of application No. PCT/EP2012/059009 filed 15 May 2012. Priority is claimed on European Application No. 11175353.9 filed 26 Jul. 2011, the content of which is incorporated herein by reference in its entirety.

BACKGROUND OF THE INVENTION

1. Field of the Invention

The invention relates to industrial automation systems and, more particularly, to a communication device, communication terminal, communication control device and method for operating a communication system for transmitting time-critical data.

2. Description of the Related Art

An industrial automation system usually comprises a multiplicity of automation devices that are networked to one another via an industrial communication network and is used within the context of production or process automation for the purpose of controlling or regulating installations, machines or devices. On account of time-critical constraints in industrial automation systems, realtime communication protocols, such as PROFINET, PROFIBUS, Real-Time Ethernet or Time-Sensitive Networking (TSN), are predominantly used for communication between automation devices.

Interruptions in communication connections between computer units in an industrial automation system or automation devices can result in undesirable or unnecessary repetition of a transmission of a service request. Furthermore, messages that are not transmitted or that are not transmitted completely can prevent an industrial automation system from changing to or remaining in a safe operating state, for example. This can finally result in failure of a complete production installation and costly production downtime. A particular set of problems regularly arises in industrial automation systems as a result of notification traffic containing comparatively many but relatively short messages, as a result of which the above problems are intensified.

On account of their being used for often extremely different applications, problems can arise in Ethernet-based communication networks, for example, if network resources for transmitting data streams or data frames with realtime demands are taken up competitively for transmitting data frames with a large payload data content without specific quality of service demands. This can result in data streams or data frames with realtime demands not being transmitted in accordance with a requested or required quality of service.

Prioritized transmission of data frames is fundamentally possible, for example, based on virtual local area networks (VLAN) in accordance with the Institute of Electrical and Electronics Engineers (IEEE) 802.1Q standard using corresponding tags inserted into data frames. Bandwidth reservation for individual communication connections that are assigned the highest priority is provided for the synchronized and prioritized transfer of audio and video data streams (audio/video bridging) via communication networks. Here, resources required for transferring audio and video data streams are reserved in communication devices, such as switches. However, high-priority data frames are forwarded only after successful reservation. During bandwidth monitoring, it is ensured that there is sufficiently reserved bandwidth for the bandwidth actually used. A communication connection that uses more bandwidth than is reserved would otherwise result in a disruption to an entire communication network and, in the worst-case scenario, would result in downtime for the communication network on account of overloading.

According to the IEEE 802.1 Qav standard, credit-based shapers (CBS) have been defined as a measure of bandwidth monitoring for the secure transfer of audio and video data streams via Ethernet-based communication networks. Credit-based shapers are used to define a transfer pause after each transferred data frame to ensure bandwidth limiting with respect to a reserved bandwidth. However, such compulsory pauses are extremely problematic in industrial automation systems when transferring a large number of data frames with a low payload data content for control data, which rather can be considered to be data bundles or bursts.

In accordance with EP 3 038 325 A1, data transmission in a communication network of an industrial automation system involves first data frames, which comprise control data for the automation system, being transmitted by coupling communication devices of the communication network only within periodic first-time intervals. Second data frames, which are assigned to data streams comprising sequences of data frames, or third data frames, for the transmission of which no quality of service or a quality of service below a predefined threshold value is stipulated, are transmitted within periodic second time intervals. The first-time intervals are divided into first and second time intervals. First data frames to be forwarded are inserted into a first or second queue in alternate subintervals and taken from the queues alternately for forwarding.

The older international patent application PCT/EP2017/066175 describes a method for data transmission that allows a combination of protected communication and low network configuration complexity. Here, a reservation of resources for transmitting data streams from a sender to a receiver results in at least two paths, at least sections of which are redundant, being reserved. By extending a reservation protocol, automatic configuration of duplicate filters at network nodes assigned to redundant path sections is performed during a resource reservation.

SUMMARY OF THE INVENTION

It is an object of the invention to provide apparatus and a method for operating a communication system for transmitting time-critical data that allows both efficient utilization of available system resources and flexible and fast adaptation for altered operational constraints, and specifying suitable apparatuses for performing the method.

This and other objects and advantages are achieved in accordance with the invention by a communication device, a communication terminal, a communication control and a method for operating a communication system for transmitting time-critical data, where selected datagrams are assigned to data streams and transmitted between first communication devices at first network nodes and second communication devices at second network nodes via paths comprising at least the first and second network nodes. A local cycle duration that is a multiple of a general cycle duration can be set on selected communication devices in each case. The local cycle duration can in particular also correspond to the general cycle duration. To reserve resources to be provided by communication devices for a transfer of data streams, reservation requests, which each comprise at least details pertaining to a first and a second network node and quality of service parameters, are each transmitted to a superordinate communication control device by a reservation function component that is assigned to a first or second communication terminal or to a communication device that is connected thereto and forwards datagrams. In the event of reservation requests the superordinate communication control device in each case ascertains a path and checks whether sufficient resources for the transfer of the data streams while observing the specified quality of service parameters are available in the communication devices along the respective path. The superordinate communication control device ascertains a proposed local cycle duration for the selected communication devices. The resources to be provided by the communication devices comprise, for example, usable transfer time windows, bandwidth, assured maximum latency, number of queues, queue cache, in particular memory for data frames or data packets, or address cache, in particular memory for addresses in filtering database (FDB), in switches or bridges.

In accordance with the invention, if there are sufficient resources, then the superordinate communication control device transmits configuration information comprising proposed local cycle durations to configuration control units that are assigned to the communication devices at the network nodes that the respective path comprises. The configuration control units set up the assigned communication devices for resource provision for the transfer of the data streams in accordance with the transmitted configuration information. Advantageously, the data streams are set up bidirectionally upon reservation requests in each case. Additionally, the superordinate communication control device preferably receives configuration guidelines from an engineering system and converts the configuration guidelines into the configuration information transmitted to the configuration control units.

Furthermore, in accordance with the invention, the superordinate communication control device continually monitors at least one predefined communication network domain for topology changes and ascertains updated configuration information for changed paths resulting from topology changes. This updated configuration information is transmitted for the purpose of updated device setup to the configuration control units that are assigned to the communication devices at network nodes that changed paths comprise. Together with reservation function components provided locally or on a decentralized basis, continual monitoring for topology changes and corresponding local configuration adaptation allow flexible and fast adaptation for altered operational constraints. In particular, taking account of local cycle durations that can be set on communication devices results in efficient utilization of available system resources, in contrast to previous resource reservation methods organized on a decentralized basis.

In accordance with one advantageous embodiment of the present invention, the communication system is assigned to an industrial automation system that comprises multiple controllers, for example, programmable logic controllers or controllers for input/output devices, and input/output devices assigned thereto. Each controller comprises a reservation function component, as well as a processor and memory accessed by the processor. The controllers use their reservation function components to request reservations of resources for the assigned input/output devices for a transfer of data streams.

Preferably, each communication device comprises at least one configuration control unit. For communication terminals, it is fundamentally sufficient if they are each connected to a forwarding communication device that has a reservation function component for transmitting reservation requests. Accordingly, the superordinate communication control device can respond to successful reservation requests by transmitting in each case a data stream destination address, assigned to the data stream, to the reservation function component of the first communication terminal or of the communication device that is connected thereto and forwards datagrams and to the reservation function component of the second communication terminal or of the communication device that is connected thereto and forwards datagrams.

In accordance with another advantageous embodiment, the communication system can comprise multiple superordinate communication control devices. Preferably, the superordinate communication control devices are ascertained via a service description recorded in a domain name system or via an identification in accordance with the PROFINET Dynamic Configuration Protocol. The superordinate communication control devices can thus select an active superordinate communication control device among one another based on a selection criterion, where non-active superordinate communication control devices are placed into a standby state. At least one redundant superordinate communication control device can therefore be kept ready for failure scenarios.

Preferably, the superordinate communication control device stores in each case a most recently detected topology of the communication system and paths ascertained for data streams that have been set up successfully. The superordinate communication control device can therefore load the most recently detected topology at the start of operation of the communication system and ascertain topology changes. Ascertained topology changes can be taken as a basis for the superordinate communication control device reusing stored paths for setting up data streams.

By way of example, a communication device, in particular a switch, a bridge or a device having an integrated switch or integrated bridge, which comprises multiple connections for connection to further communication devices and also a coupling element by means of which the connections are switchably connectable to one another is suitable for performing the method in accordance with the disclosed embodiments. Moreover, the communication device comprises a reservation function component and a configuration control unit. In addition, the communication device is configured to transmit datagrams assigned to a data stream between a first communication device at first network nodes and a second communication device at a second network node.

The reservation function component of the above communication device in accordance with the invention is preferably configured to transmit to a superordinate communication control device a reservation request, which comprises in each case at least details pertaining to the first and second network nodes and quality of service parameters, to reserve resources to be provided by communication devices for a transfer of the data stream. The configuration control unit of the communication device is configured to receive configuration information from the superordinate communication control device and to set up the communication device for the transfer of the data stream in accordance with the received configuration information.

By way of example, a communication terminal that comprises at least one connection for connection to a communication device that forwards datagrams, in particular a switch, a bridge or a device having an integrated switch or integrated bridge, is suitable for performing a method in accordance with the disclosed embodiments. Moreover, this communication terminal comprises a configuration control unit. In addition, the communication terminal is configured to transmit datagrams assigned to a data stream between a first communication device at first network nodes and a second communication device at a second network node.

Furthermore, the above disclosed communication terminal is preferably configured to use its own reservation function component or a reservation function component of a connected communication device that forwards datagrams to transmit to a superordinate communication control device a reservation request, which comprises in each case at least details pertaining to the first and second network nodes and quality of service parameters, to reserve resources to be provided by communication devices for a transfer of the data stream. The configuration control unit of the communication terminal is configured to receive configuration information from the superordinate communication control device and to set up the communication terminal for the transfer of the data stream in accordance with the received configuration information.

The communication control device in accordance with the invention is provided to perform the method in accordance with the disclosed embodiments and comprises at least one connection for connection to a communication device that forwards datagrams. The communication control device is configured to, in the event of reservation requests, reserve resources to be provided by communication devices for a transfer of data streams, in each case to ascertain a path and to check whether sufficient resources for the transfer of the data streams while observing the specified quality of service parameters are available in communication devices along the respective path, and to ascertain a proposed local cycle duration for selected communication devices.

Furthermore, the communication control device in accordance with the invention is configured to, if there are sufficient resources, transmit configuration information comprising proposed local cycle durations to configuration control units that are assigned to the communication devices at network nodes that the respective path comprises. Additionally, the communication control device is configured to continually monitor at least one predefined communication network domain for topology changes, to ascertain updated configuration information for changed paths resulting from topology changes and to transmit said information for the purpose of updated device setup to the configuration control units that are assigned to the communication devices at network nodes that changed paths comprise.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

The present invention is explained in more detail below using an exemplary embodiment with reference to the drawing, in which.

DETAILED DESCRIPTION OF THE EXEMPLARY EMBODIMENTS

Figure 1:
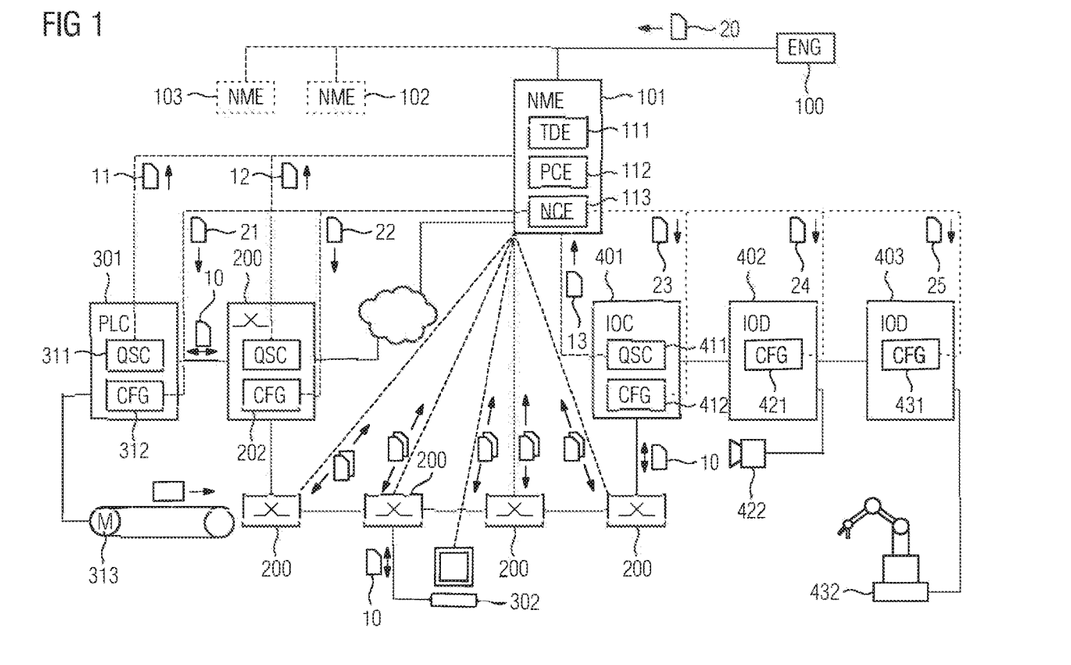
FIG. 1 shows a communication system, comprising multiple communication devices, for an industrial automation system in accordance with the invention.

The communication system depicted in FIG. 1 for an industrial automation system comprises multiple bridges or switches 200, as communication devices that forward datagrams, and superordinate communication control units 101, 102, 103. Bridges or switches 200 are particularly used for connecting programmable logic controllers 301, operating and observation stations 302, I/O controllers 401 or I/O modules 402-403, which are likewise communication devices or communication terminals. In the present exemplary embodiment, the communication system is configured as a time-sensitive network, in particular in accordance with Institute of Electrical and Electronics Engineers (IEEE) 802.3-2018, IEEE 802.1Q-2018, IEEE 802.1AB-2016, IEEE 802.1AS-2011, IEEE 802.1BA-2011 or IEEE 802.1CB-2017.

Programmable logic controllers 301 typically comprise a communication module, a central processing unit and at least one input/output unit in each case. Input/output units may fundamentally also be configured as decentralized peripheral modules arranged remotely from a programmable logic controller. The communication module can be used to connect a programmable logic controller 301 to a switch or router or additionally to a field bus. The input/output unit is used for interchanging control and measured variables between the programmable logic controller 301 and a machine or apparatus 313 controlled by the programmable logic controller 301. The central processing unit is provided in particular to ascertain suitable control variables from captured measured variables. The above components of the programmable logic controller 301 are connected to one another via a backplane bus system, for example.

The I/O modules 402-403 are also provided to interchange control and measured variables with connected machines or apparatuses 422, 432. To control the I/O modules, there is provision for one assigned I/O controller 401 per automation cell, for example. The I/O modules 402, 403 can fundamentally also be controlled by a remote programmable logic controller 301.

An operating and observation station 302 is used for visualizing process data or measured and control variables that are processed or captured by programmable logic controllers, input/output units or sensors. In particular, an operating and observation station 302 is used to display values of a control loop and to change control parameters. Operating and observation stations 302 comprise at least one graphical user interface, an input device, a processor unit and a communication module.

First communication or automation devices, which in particular have a talker or provider function, are used to provide information or services via data streams for use on second communication or automation devices, which in particular have a listener or consumer function. An automation device can simultaneously have both one or more talker functions and one or more listener functions, for example, if it firstly provides automation services and secondly uses automation services of other devices. For this reason, data streams are preferably set up bidirectionally upon reservation requests in each case in the present exemplary embodiment.

The programmable logic controller 301 and the I/O modules 402, 403 can supply measured values, for example, and can therefore have a talker function. By contrast, the operating and observation station 302 can have a listener function and in particular receive information provided by the programmable logic controller 301 or the I/O modules 402, 403. In principle, the operating and observation station 302 could analyse information received from the programmable logic controller 301 or the I/O modules 402-403 and could predefine control parameters for the programmable logic controller 301 or the I/O modules 402, 403 therefrom. Therefore, both the programmable logic controller 301 or the I/O modules 402, 403 and the operating and observation station 302 can perform both functions.

To transmit time-critical data, selected datagrams 10 are assigned to data streams and transmitted between first communication devices 301 at first network nodes and second communication devices 302, 402, 403 at second network nodes via paths comprising at least the first and second network nodes. Such data streams can be set up between the programmable logic controller 301 and the operating and observation station 302 or between the programmable logic controller 301 and the I/O modules 402-403, for example.

Figure 2:
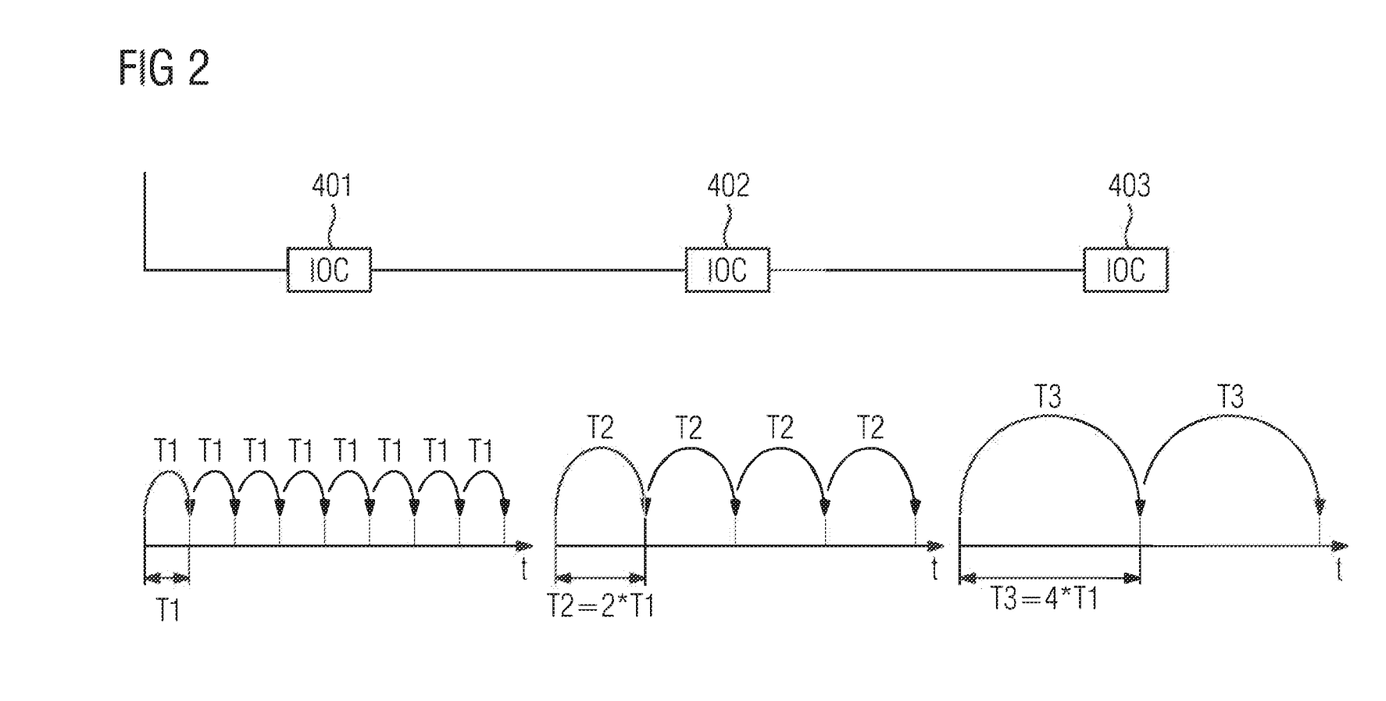
FIG. 2 shows a schematic depiction of communication devices of the communication system shown in FIG. 1, for each of which a local cycle duration that is a multiple of a general network-wide cycle duration is set.

In accordance with FIG. 2, a local cycle duration T2, T3 that is a multiple of a general network-wide cycle duration T1 can be set on selected communication devices 402-403 in each case. While a general network-wide transmission cycle T1=31.25 µs is set on the I/O controller 401, for example, a transmission cycle T2=62.5 µs or T3=125 µs can be set on the two I/O modules 402-403. Accordingly, transmission queue fill patterns change in the I/O modules 402-403 in comparison with the I/O controller 401.

Original cycle durations of network nodes that transmit in each case are retained for arriving datagrams in the event of forwarding. This means that, for example, for cyclic data traffic, in the event of forwarding by a network node with an underclocked transmission cycle, multiple transmission time windows are provided within the underclocked transmission cycle. For cyclic data traffic that sets out directly from the network node with an underclocked transmission cycle, fundamentally only one transmission time window is provided within the underclocked transmission cycle. A local cycle duration that corresponds to a multiple of a general network-wide cycle duration can be set not only in the event of transmission queue control via time-aware shapers (formerly IEEE 802.1Qbv, currently IEEE 802.1Q-2018), but also in the event of transmission queue control via credit-based shapers (formerly IEEE 802.1Qav, currently IEEE 802.1Q-2018), burst limiting shapers, peristaltic shapers or priority-based shapers.

Reservation requests 11, 12, 13, which each comprise at least details pertaining to a first and a second network node and quality of service parameters, are transmitted, so as to reserve resources to be provided by communication devices 200 for a transfer of data streams, to a superordinate communication control device 101 in each case by a reservation function component 201, 311, 411 that is assigned to a first or second communication terminal 301, 302, 402, 403 or to a communication device 200, 401 that is connected thereto and forwards datagrams. The resources to be provided by the communication devices comprise usable transfer time windows, bandwidth, assured maximum latency, number of queues, queue cache and address cache in switches or bridges, for example.

The communication system can comprise multiple superordinate communication control devices 101, 102, 103. These superordinate communication control devices 101, 102, 103 can be ascertained, for example, via a service description recorded in a domain name system or via an identification in accordance with the PROFINET Dynamic Configuration Protocol, the latter even without design or engineering. On the basis thereof, the superordinate communication control devices 101, 102, 103 select an active superordinate communication control device among one another based on of a selection criterion. Non-active superordinate communication control devices 102, 102, 103 are placed into a standby state.

In the event of reservation requests, the active superordinate communication control device 101 in each case ascertains a path via a path calculation component 112 and checks whether sufficient resources for the transfer of the data streams while observing the specified quality of service parameters are available in the communication devices 200, 401 along the respective path. The active superordinate communication control device 101 additionally ascertains a proposed local cycle duration for each of the selected communication devices 402, 403.

If there are sufficient resources, then the superordinate communication control device 101 creates configuration information 21, 22, 23, 24, 25 comprising local cycle durations proposed via a network configuration component 113 and transmits the information to configuration control units 202, 312, 412, 421, 431 that are assigned to the communication devices 200, 301, 302, 401, 402, 403 at the network nodes that the respective path comprises. Furthermore, the superordinate communication control device 101 in the present exemplary embodiment receives configuration guidelines 20 from an engineering system 100 and converts the configuration guidelines into the configuration information 21, 22, 23, 24, 25 transmitted to the configuration control units 202, 312, 412, 421, 431. The configuration guidelines 20 can be used to control, for example, an application of pre-emption with strict priority (see, e.g., IEEE 802.1Q-2018) for the data streams in the communication devices 200, 301, 302, 401, 402, 403. The configuration control units 202, 312, 412, 421, 431 set up the assigned communication devices 200, 301, 302, 401, 402, 403 for resource provision for the transfer of the data streams in accordance with the transmitted configuration information 21, 22, 23, 24, 25.

In the present exemplary embodiment, each communication device comprises a configuration control unit. For communication terminals, it is fundamentally sufficient if a connected communication device that forwards datagrams has a reservation function component for transmitting reservation requests. Accordingly, the I/O controller 401 uses its reservation function component 411 to request reservations of resources for the I/O modules for a transfer of data streams. By and large, the superordinate communication control device 101 can respond to successful reservation requests by transmitting in each case a data stream destination address, assigned to the data stream, to the reservation function component of the first communication terminal or of the communication device that is connected thereto and forwards datagrams and to the reservation function component of the second communication terminal or of the communication device that is connected thereto and forwards datagrams.

The superordinate communication control device 101 uses a topology detection unit 111 to continually monitor at least one predefined communication network domain for topology changes. Domain boundaries are preferably ascertained via the Link Layer Discovery Protocol. Communication device identification can be effected, for example, via the Dynamic Host Configuration Protocol or PROFINET Dynamic Configuration Protocol. The network configuration component 113 of the superordinate communication control device 101 ascertains updated configuration information 21, 22, 23, 24, 25 for changed paths resulting from topology changes and transmits said information for the purpose of updated device setup to the configuration control units 202, 312, 412, 421, 431 that are assigned to the communication devices 200, 301, 302, 401, 402, 403 at network nodes that changed paths comprise.

In accordance with a preferred embodiment, the superordinate communication control device 101 stores in each case a most recently detected topology of the communication system and paths ascertained for data streams that have been set up successfully. At the start of operation of the communication system, the superordinate communication control device 101 loads the most recently detected topology and uses the topology detection unit 111 to ascertain topology changes. Based on ascertained topology changes, the superordinate communication control device 101 can reuse stored paths for setting up data streams.

Figure 3:
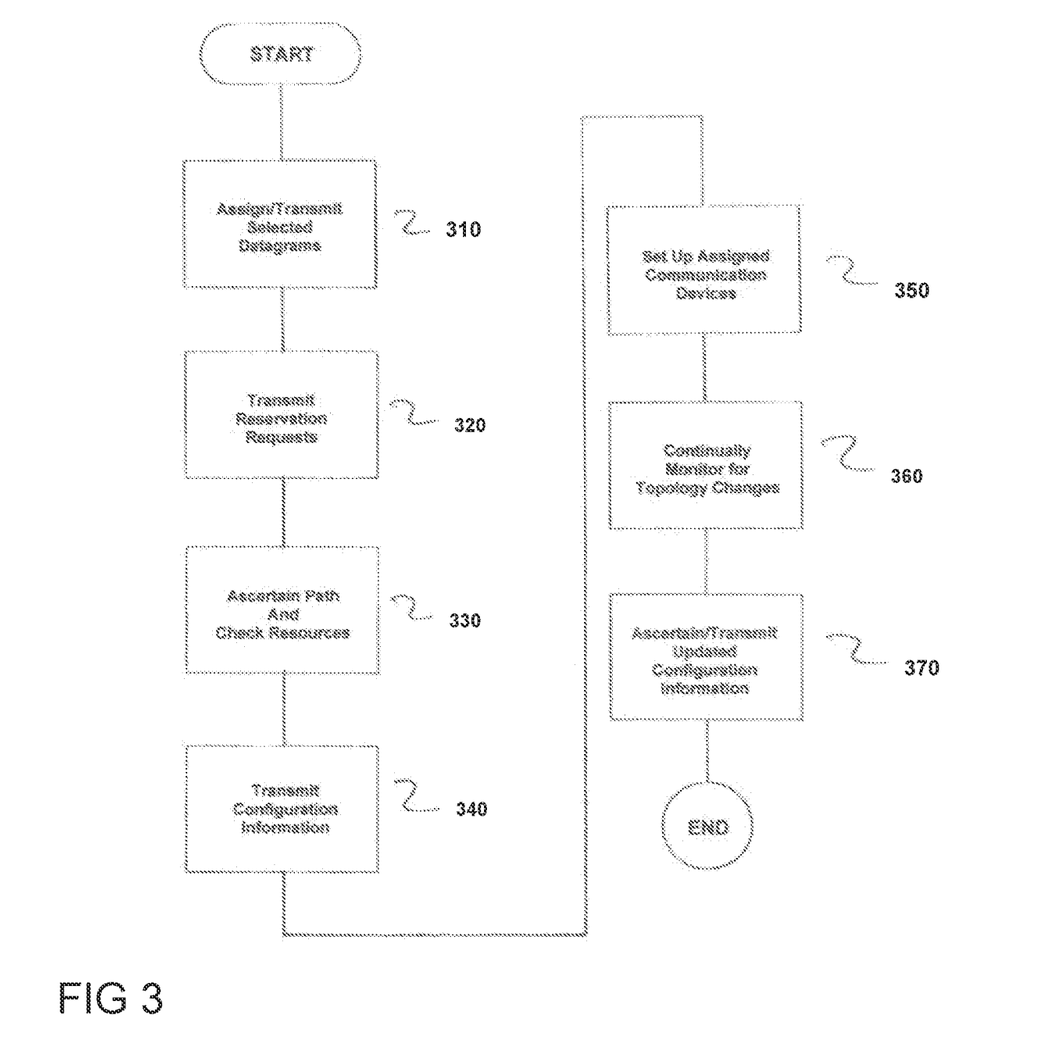
FIG. 3 is a flowchart of the method in accordance with the invention.

FIG. 3 is a flowchart of the method for operating a communication system for transmitting time-critical data. The method comprises assigning selected datagrams 10 to data streams and transmitting the selected datagrams 10 between first communication devices at first network nodes and second communication devices at second network nodes via paths comprising at least the first and second network nodes, as indicated in step 310. In accordance with the invention, the local cycle duration comprises a multiple of a general cycle duration that are settable on each selected communication device 402, 403.

Next, reservation requests 11, 12, 13, which each comprise at least details pertaining to a first and a second network node and quality of service parameters, are transmitted to reserve resources to be provided by communication devices for a transfer of data streams, to a superordinate communication control device 101 in each case by a reservation function component 201, 311, 411 which is assigned to a first or second communication terminal and/or a communication device 200, 301-302, 401, 402, 403 that is connected thereto and forwards datagrams, as indicated in step 320.

Next, the superordinate communication control device 101, in the event of reservation requests in each case ascertains a path and checks whether sufficient resources for the transfer of the data streams while observing the specified quality of service parameters are available in the communication devices along the respective path, and ascertains a proposed local cycle duration for the selected communication devices, as indicated in step 330.

Next, the superordinate communication control device 101 transmits configuration information 21, 22, 23, 24, 25 comprising proposed local cycle durations to configuration control units 202, 312, 412, 421, 431 that are assigned to communication devices at the network nodes which the respective path comprises, if there are sufficient resources exist, as indicated in step 340.

Next, the configuration control units 202, 312, 412, 421, 431, set up the assigned communication devices for resource provision for the transfer of the data streams in accordance with the transmitted configuration information, as indicated in step 350.

Next, the superordinate communication control device 101 continually monitors at least one predefined communication network domain for topology changes, as indicated in step 360.

Next, the superordinate communication control device 101 ascertains updated configuration information for changed paths resulting from topology changes and transmits the updated configuration information for updating device setup to the configuration control units 202, 312, 412, 421, 431 that are assigned to the communication devices at network nodes that changed paths comprise, as indicated in step 370.

Thus, while there have been shown, described and pointed out fundamental novel features of the invention as applied to a preferred embodiment thereof, it will be understood that various omissions and substitutions and changes in the form and details of the methods described and the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

The invention claimed is:

1. A method for operating a communication system for transmitting time-critical data, the method comprising:

assigning selected datagrams to data streams and transmitting said selected datagrams between first communication devices at first network nodes and second communication devices at second network nodes via paths comprising at least the first and second network nodes, a local cycle duration comprising a multiple of a general cycle duration being settable on each selected communication device;

transmitting reservation requests, which each comprise at least details pertaining to a first and a second network node and quality of service parameters, to reserve resources to be provided by communication devices for a transfer of data streams, to a superordinate communication control device in each case by a reservation function component which is assigned to one of (i) a first or second communication terminal and (ii) a communication device which is connected thereto and forwards datagrams;

ascertaining, by the superordinate communication control device, in an event of reservation requests the superordinate communication control device in each case a path and checking, by the superordinate communication control device, whether sufficient resources for the transfer of the data streams while observing the specified quality of service parameters are available in the communication devices along the respective path and ascertaining, by the superordinate communication control device, a proposed local cycle duration for the selected communication devices;

transmitting, by the superordinate communication control device, configuration information comprising proposed local cycle durations to configuration control units which are assigned to communication devices at the network nodes which the respective path comprises, when sufficient resources exist;

setting up, by the configuration control units, the assigned communication devices for resource provision for the transfer of the data streams in accordance with the transmitted configuration information;

monitoring continually, by the superordinate communication control device, at least one predefined communication network domain for topology changes; and ascertaining, by the superordinate communication control device, updated configuration information for changed paths resulting from topology changes and transmitting said updated configuration information for updating device setup to the configuration control units which are assigned to the communication devices at network nodes which changed paths comprise.

2. The method as claimed in claim 1, wherein the resources to be provided by the communication devices comprise at least one of (i) usable transfer time windows, (ii) bandwidth, assured maximum latency, (iii) number of queues, (iv) queue cache and (v) address cache in switches or bridges.

3. The method as claimed in claim 2, wherein the first communication devices are connected to the second communication devices via a time-sensitive network.

4. The method as claimed in claim 3, wherein the time-sensitive network is in accordance with at least one of (i) Institute of Electrical and Electronics Engineers (IEEE) 802.3-2018, (ii) IEEE 802.1Q-2018, (iii) IEEE 802.1AB-2016, (iv) IEEE 802.1AS-2011, (v) IEEE 802.1BA-2011 and (vi) IEEE 802.1CB-2017.

5. The method as claimed in claim 1, wherein the first communication devices are connected to the second communication devices via a time-sensitive network.

6. The method as claimed in claim 5, wherein the time-sensitive network is in accordance with at least one of (i) Institute of Electrical and Electronics Engineers (IEEE) 802.3-2018, (ii) IEEE 802.1Q-2018, (iii) IEEE 802.1AB-2016, (iv) IEEE 802.1AS-2011, (v) IEEE 802.1BA-2011 and (vi) IEEE 802.1CB-2017.

7. The method as claimed in claim 5, wherein forwarding of the selected datagrams is controlled via at least one of (i) frame pre-emption in accordance with Institute of Electrical and Electronics Engineers (IEEE) 802.1Q-2018, (ii) time-aware shapers in accordance with IEEE 802.1Q-2018, (iii) credit-based shapers in accordance with IEEE 802.1Q-2018, (iv) burst limiting shapers, (v) peristaltic shapers and (vi) priority-based shapers.

8. The method as claimed in claim 1, wherein the data streams are each set up bidirectionally upon reservation requests.

9. The method as claimed in claim 1, wherein the superordinate communication control device ascertains domain boundaries in accordance with a Link Layer Discovery Protocol.

10. The method as claimed in claim 9, wherein the superordinate communication control device performs communication device identification via one of Dynamic Host Configuration Protocol and PROFINET Dynamic Configuration Protocol.

11. The method as claimed in claim 1, wherein the superordinate communication control device receives configuration guidelines from an engineering system and converts said configuration guidelines into the configuration information transmitted to the configuration control units.

12. The method as claimed in claim 11, wherein the configuration guidelines are utilized to control an application of pre-emption with strict priority for the data streams in the communication devices.

13. The method as claimed in claim 1, wherein each communication device comprises a configuration control unit, and wherein the superordinate communication control device responds to successful reservation requests by transmitting in each case a data stream destination address, assigned to the data stream, to the reservation function component of one of (i) the first communication terminal and (ii) the communication device which is connected thereto and forwards datagrams and to the reservation function component of one of (i) the second communication terminal and (ii) the communication device which is connected thereto and forwards datagrams.

14. The method as claimed in claim 1, wherein the communication system is assigned to an industrial automation system which comprises a plurality of controllers and input/output devices assigned thereto; wherein the plurality of controllers each comprise a reservation function component; and wherein the plurality of controllers each utilize a respective reservation function component to request reservations of resources for the assigned input/output devices for a transfer of data streams.

15. The method as claimed in claim 1, wherein the communication system comprises a plurality of superordinate communication control devices; wherein the plurality of superordinate communication control devices are ascertained via one of (i) a service description recorded in a domain name system and (ii) an identification in accordance with the PROFINET Dynamic Configuration Protocol; and wherein each of the plurality of superordinate communication control devices select an active superordinate communication control device among one another based on a selection criterion, non-active superordinate communication control devices being placed into a standby state.

16. The method as claimed in claim 1, wherein the superordinate communication control device stores in each case a most recently detected topology of the communication system and paths ascertained for successfully set up data streams; wherein the superordinate communication control device loads a most recently detected topology at a start of operation of the communication system and ascertains topology changes, and wherein the superordinate communication control device takes ascertained topology changes as a basis for reusing stored paths for setting up data streams.

17. A communication control device comprising:
  a processor;
  memory accessed by the processor; and
  at least one connection for connection to a communication device which forwards datagrams;
  wherein the communication control device is configured to, in an event of reservation requests, reserve resources to be provided by communication devices for a transfer of data streams, in each case to ascertain a path and to check whether sufficient resources for the transfer of the data streams while observing specified quality of service parameters are available in communication devices along the respective path, and to ascertain a proposed local cycle duration for selected communication devices;

wherein the communication control device is further configured to, when sufficient resources exist, transmit configuration information comprising proposed local cycle durations to configuration control units which are assigned to the communication devices at network nodes which the respective path comprises; and wherein the communication control device is further configured to continually monitor at least one pre-defined communication network domain for topology changes, to ascertain updated configuration information for changed paths resulting from topology changes and to transmit said updated configuration information for updating device setup to the configuration control units which are assigned to the communication devices at network nodes which changed paths comprise.

\* \* \* \* \*